Figure 1:
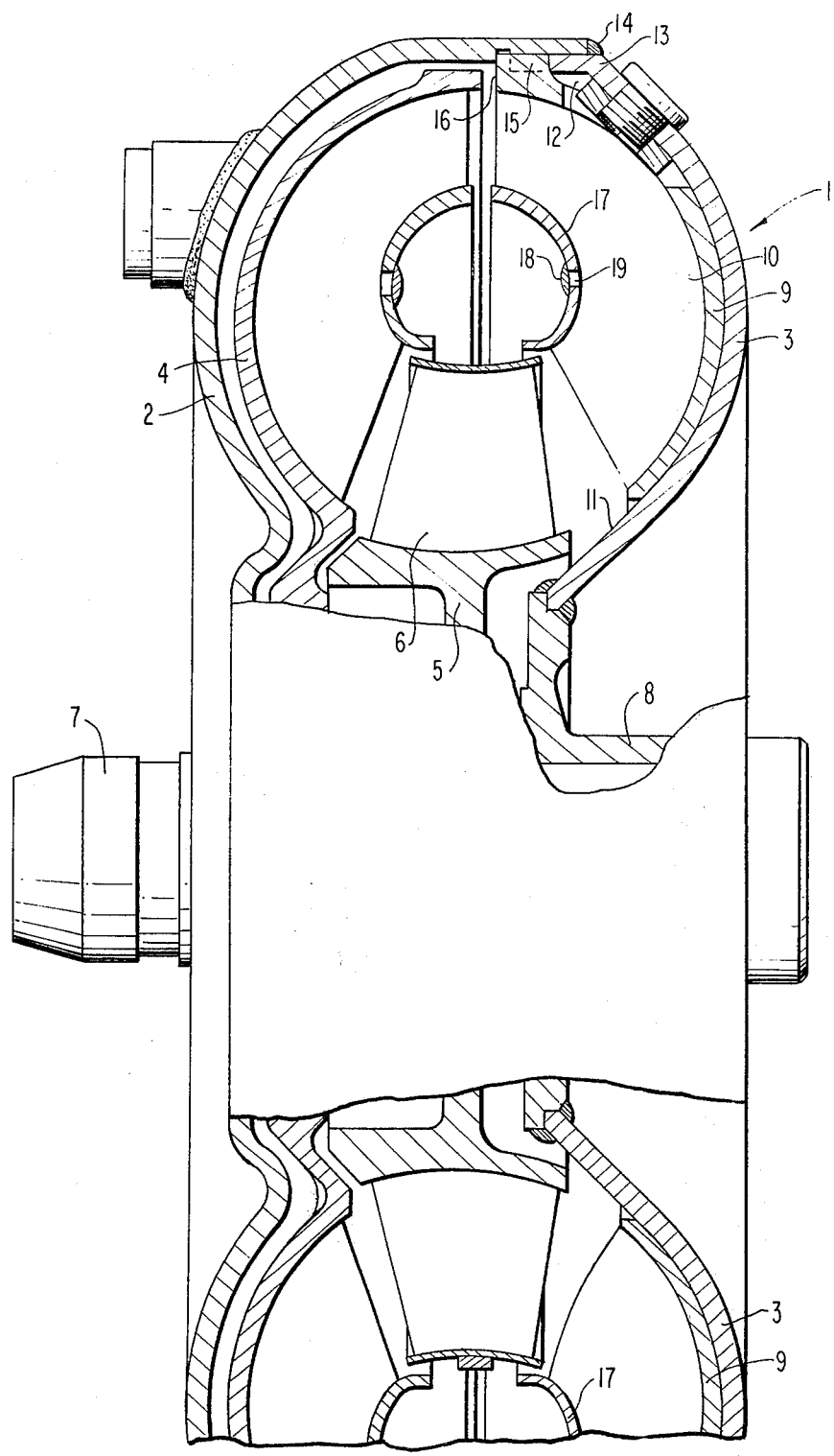

United States Patent [19]
Helmer

[11] 3,981,614
[45] Sept. 21, 1976

[54] PUMP WHEEL FOR A HYDRODYNAMIC UNIT

[75] Inventor: Josef Helmer, Aich, Germany

[73] Assignee: Daimler-Benz Aktiengesellschaft, Germany

[22] Filed: Sept. 11, 1974

[21] Appl. No.: 505,010

[30] Foreign Application Priority Data
Sept. 14, 1973  Germany............................ 2346356

[52] U.S. Cl. .............................. 416/180; 416/197 C
[51] Int. Cl.² ............................................ F01D 5/04
[58] Field of Search ...................... 416/180, 197 C; 29/156.8 FC

[56] References Cited
UNITED STATES PATENTS

| | | |
|---|---|---|
| 2,324,011 | 7/1943 | Miller ................................ 416/180 |
| 2,478,306 | 8/1949 | Orr ..................................... 416/180 |
| 2,481,541 | 9/1949 | Schneider ........................... 416/180 |
| 2,503,025 | 4/1950 | Bolender ......................... 416/180 X |
| 2,691,812 | 10/1954 | Misch .............................. 416/180 X |
| 2,763,215 | 9/1956 | Misch ................................ 416/180 |
| 2,855,852 | 10/1958 | Gamble ............................. 416/180 |

Primary Examiner—Everette A. Powell, Jr.
Attorney, Agent, or Firm—Craig & Antonelli

[57] ABSTRACT

A pump wheel for a hydrodynamic unit, especially for a torque converter or a hydrodynamic coupling of motor vehicles, with a pump wheel outer shell that consists of cold-deformed sheet metal material with a welded-in hub member and which receives the pump wheel blades; the pump wheel blades are thereby cast together with a shell member matched to the inner surface of the pump wheel outer shell, whereby the shell member is so inserted into the pump wheel outer shell that entrainment members cast integral therewith engage in corresponding apertures of the pump wheel outer shell.

6 Claims, 3 Drawing Figures

PUMP WHEEL FOR A HYDRODYNAMIC UNIT

The present invention relates to a pump wheel for a hydrodynamic unit, especially for a torque converter or a hydrodynamic coupling of motor vehicles with a pump wheel outer shell which consists of cold-deformed sheet metal, with a welded-in-hub member and which receives the pump wheel blades.

Up to now, such pump wheels whose outer shell was welded together with a corresponding counter shell-half, were made of cold-deformed sheet metal material. The pump wheel blades to be carried by this sheet metal shell were secured relatively complicated in the pump wheel outer shell in the most varied ways. On the one hand, it was known to emboss or indent grooves into the pump wheel outer shell, into which the blades were inserted. On the other hand, rings bent from bands were installed at the inner diameter or also additionally at the outer diameter of the pump wheel outer shell, which were provided with slots, into which the blades had to be individually inserted manually in a relatively complicated operation. The rings bent from sheet metal strips were then riveted or spot-welded in the pump wheel outer shell and the blades were then brazed fast in the protective gas furnace. The protective gas soldering or brazing, however, could not be dispensed with by reason of the high rotational speeds to which the hydrodynamic unit is exposed. However, the cold-rolled sheet metal material which was hardened by the subsequent deformation, was thereby again annealed so that the strength possible as such by the used material of the pump wheel outer shell and therewith the load and stress capability of the hydrodynamic unit was considerably reduced.

It is the aim of the present invention to avoid these disadvantages, to maintain the increased strength achieved by the deformation of the cold-rolled sheet metal material and to simplify and reduce the costs of the manufacture of the pump wheels.

The underlying problems are solved according to the present invention in that the pump wheel blades are cast together with a shell member matched to the inner surface of the pump wheel outer shell and that this shell member is so inserted into the pump wheel outer shell that entrainment members cast integral therewith engage in corresponding apertures of the pump wheel outer shell. According to a further feature of the present invention, the entrainment members and the corresponding apertures may be provided at the periphery of the shell member and of the pump wheel outer shell. No additional axial play results therefrom during the deformation caused by the operation of the pump wheel within the elastic range by the torque entrainment and the axial stressing of the pump part at the outermost diameter which is most favorable from a force and strength point of view. As a result thereof, and as a result of the increased strength which remains preserved, the pump wheel can be loaded more strongly. Tests have indicated in particular that with the pump wheel of the present invention the rated rotational speed at which a permanent deformation will at first occur, has been increased by about 1,000 rpm compared to the pump wheel of prior art construction.

As to the rest, pins cast-on integrally at the inner circumference of the pump wheel blades facilitate the assembly of the pump wheel. For that purpose, the pins engaging in apertures of an inner ring also cast in the shape of a shell, similar to the shape of the shell member and placed over the blades from the inside thereof, are fused rivetshaped for the retention of the inner ring, preferably by means of a hot pressure stamp. The heat-up necessary thereby will be effective only locally and has absolutely no influence any longer on the strength of the pump wheel as such, in contrast to the prior art protective gas brazing. By the manufacture of the blades preferably in the die-casting process, the blades may also be readily provided with a blade profile which is favorable from a technical flow or streamlining point of view, whereby the pump wheel blades have variable cross-sectional profiles.

For the purpose of the facilitated assembly of the outer halves of the pump manufactured of sheet metal material, it may be appropriate if the pump wheel outer shell is provided with a bent-out portion within the area of the welded seam which connects the pump wheel outer shell arranged on the driven side with the pump wheel shell half arranged on the driving or input side, which bent-out portion causes the creation within this area of an air space between the inner surface of the pump wheel outer shell and the outer surface of the shell member. It is prevented by this measure that the shell member during the welding together of the pump wheel shell halves is being influenced negatively from a heat point of view.

Accordingly, it is an object of the present invention to provide a pump wheel for a hydrodynamic unit which avoids by simple means the aforementioned shortcomings and drawbacks encountered in the prior art.

Another object of the present invention resides in a pump wheel for a hydrodynamic unit which eliminates complicated assembly methods which were required with the prior art constructions.

A further object of the present invention resides in a pump wheel construction for hydrodynamic units which permits the retention of the increased strength of the sheet metal material which was obtained by cold-rolling and subsequent deformation.

Still a further object of the present invention resides in a pump wheel of the type described above which not only excels by increased strength but also is characterized by simplicity and low cost in manufacture thereof.

Another object of the present invention resides in a pump wheel for hydrodynamic units in which the blades with variable cross-sectional profile may be readily manufactured by conventional die-casting techniques.

Figure 2:
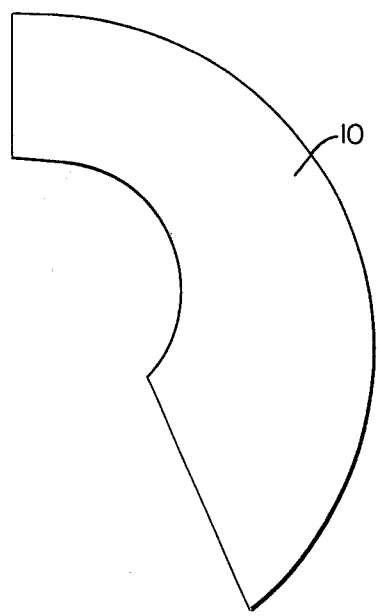
Figure 3:
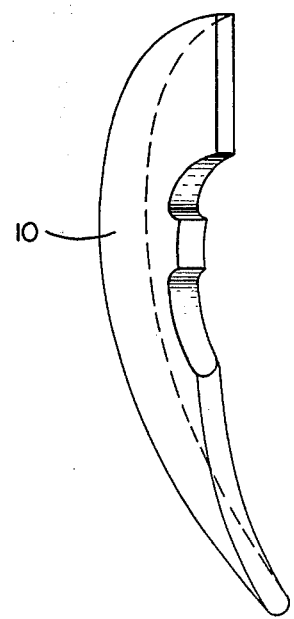

These and other objects, features and advantages of the present invention will become more apparent from the following description when taken in connection with the accompanying drawing which shows, for purposes of illustration only, one embodiment in accordance with the present invention, and wherein:

FIG. 1 is an elevational view, partly in axial cross section through a hydrodynamic unit with a pump wheel construction in accordance with the present invention; and FIGS. 2 and 3 are a plan view and a perspective view, respectively, of a pump wheel blade in accordance with the present invention.

Referring now to the single figure of the drawing, the hydrodynamic unit illustrated therein essentially consists of the pump wheel generally designated by reference numeral 1 which is assembled of two pump wheel shell halves 2 and 3, of the turbine wheel 4 and of the guide wheel 5 with the guide blades 6. The hub 7 is welded into the pump wheel shell half 2 on the input or driving side as driving side as driving member. The hub member 8 is welded into the pump wheel outer shell 3 on the output or driven side. The pump wheel outer shell 3 consists of cold-deformed sheet metal material and receives a shell member 9 cast by the die-casting method, which carries on its inner side the pump blades 10. The outer surface of the shell member 9 is matched to the inner surface 11 of the pump wheel outer shell 3 so that the two surfaces abut at one another in the assembled condition except for an air space 12. This air space 12 is the result of a bent-portion 13 of the pump wheel outer shell 3. It is intentionally arranged at the welding seam 14 in order that a heat transfer from the pump wheel outer shell 3 to the shell member 9 is prevented during the application of the welding seam 14.

The shell member 9 which is cast together with the pump blades 10, is provided at its outermost edge with cast-on entrainment members 15 which engage into corresponding apertures or recesses of the pump wheel outer shell 3. Additionally, the pump wheel shell half 2 includes a stepped portion at which abuts the inner edge 16 of the shell member 9 so that the entrainment members 15 are securely surrounded on three sides by the pump wheel outer shell 3 and on one side by the pump wheel shell half 2, since the pump wheel shell halves 2 and 3 are securely pressed together before and while being welded together. As a result thereof, the torque entrainment is displaced to the periphery of the pump wheel and no additional axial play results during the deformation within the elastic range by the torque entrainment and the axial stressing of the pump part at the outer diameter which area is most favorable from a force and strength point of view.

For casting reasons, the inner ring 17 cannot be cast together with the shell member 9 and the blades 10. The inner ring 17 is therefore separately cast and placed subsequently over the periphery of the blades. For fastening the inner ring 17, pins are cast integrally with the inner circumference of the blades 10 which engage in holes or apertures 19 of the inner ring 17 similar to the shape of the shell member 9, after the inner ring 17 is placed over and mounted on the pump blades 10 from the inside thereof. After the emplacement of the inner ring 17, the pins are melted or fused into rivets 18 by means of a hot pressure stamp which connect the inner ring 17 securely with the pump blades 10 in the position illustrated in the drawing. As shown in FIGS. 2 and 3, the pump blades 10 have a variable cross-sectional profile thereby permitting such blades to be readily manufactured by conventional die-casting techniques.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A pump wheel for a hydrodynamic unit with a hub member, a pump wheel outer shell means welded to said hub member, said pump wheel outer shell means essentially consist of cold-deformed sheet metal material, the pump wheel comprising:
    a shell member having an outer surface substantially matched to an inner surface of the pump wheel outer shell means,
    pump wheel blade means having a variable cross-sectional profile integrally cast with said shell member,
    a plurality of torque entrainment means for entraining said shell member and said pump wheel outer shell means, said entrainment means being cast integrally with said shell member and being spaced from each other along the outer circumference of said shell member,
    a plurality of spaced apertures provided in the inner surface of the pump wheel outer shell means along the outer circumference thereof for engaging respective ones of said plurality of torque entrainment means,
    pins cast integrally at the inner circumference of the pump blade means,
    a cast inner ring means having a shell shape substantially similar to the shape of the shell member, and
    aperture means provided in said cast inner ring means for receiving said pins, said inner ring means is placed over the pump blade means from the inside thereof, said pins are fused rivet-shaped for the retention of the inner ring means, said pump wheel outer shell means is provided at the output side of the hydrodynamic unit, a second pump wheel outer shell means is provided at the input side of the hydrodynamic unit, a welding seam along the outer circumference of the pump wheel for connecting said pump wheel outer shell means disposed on the output side with said second pump wheel outer shell means disposed at the input side, said pump wheel outer shell means arranged at the output side being provided with a bent portion at the outer circumference thereof within the area of the welding seam, said bent portion producing within the area of the welding seam an air space between the inner surface of the pump wheel outer shell means arranged on the output side and the outer surface of said shell member,
    said shell member terminates in an inner edge portion at the outer circumference thereof, said second pump wheel outer shell means including a stepped portion engaging said inner edge portion of said shell member and a further portion extending from said stepped portion, said further portion including an inner surface engaging the outer surface of at least a portion of said bent portion, said further portion of said second pump wheel outer shell means terminating in an outer edge portion, said welding seam being provided at said outer edge portion.

2. A pump wheel according to claim 1, wherein the hydrodynamic unit is a torque converter.

3. A pump wheel according to claim 1, wherein the hydrodynamic unit is a hydrodynamic coupling.

4. A pump wheel according to claim 1, wherein said pins are fused into rivets with a hot pressure stamp.

5. A pump wheel according to claim 1, wherein a second shell member is provided having an outer surface substantially matched to an inner surface of said second pump wheel outer shell means, pump blade means integrally cast with said second shell member, pins cast integrally at the inner circumference of said pump blade means of said second shell member, a second cast inner ring means having a shape similar to the shape of said second shell member, aperture means provided in said second inner ring means for receiving and retaining said pins cast at said pump blade means of said second shell member.

6. A pump wheel according to claim 5, wherein a second hub member is provided, said second hub wheel outer shell means being welded to said second hub member.

* * * * *